June 27, 1950 G. L. USSELMAN 2,512,729

OSCILLATION FREQUENCY MULTIPLIER CIRCUIT

Filed Sept. 16, 1947

INVENTOR.
GEORGE L. USSELMAN
BY
ATTORNEY

Patented June 27, 1950 2,512,729

UNITED STATES PATENT OFFICE 2,512,729

OSCILLATION FREQUENCY MULTIPLIER CIRCUIT

George L. Usselman, Port Jefferson, N. Y., assignor to Radio Corporation of America, a corporation of Delaware Application September 16, 1947, Serial No. 774,268

16 Claims. (Cl. 250—36)

The present invention relates to oscillator circuits in general, and in particular to the combination of a crystal oscillator and a frequency multiplier circuit.

A purpose of this invention is to provide a new and improved oscillation frequency multiplier circuit which will be more flexible and more efficient in operation. My invention, which employs a single electronic stage, may best be understood by referring to the accompanying drawing, in which.

Figures 1, 2:
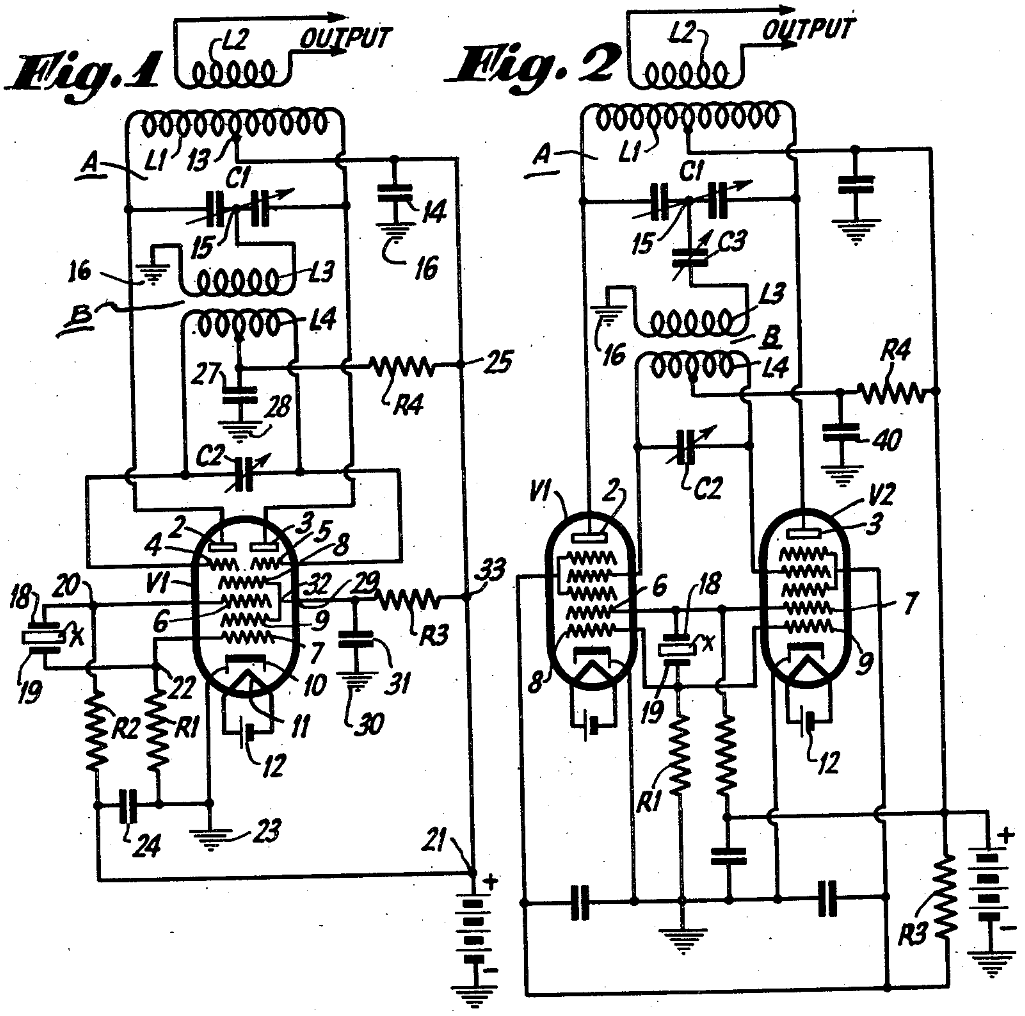
Fig. 1 is a circuit diagram of my invention.
Fig. 2 is a circuit diagram of a modification of Fig. 1.

Referring now in detail to Fig. 1 of the drawing, the vacuum tube V1 is of the duplex type having a pair of anodes 2, 3 which may be termed auxiliary anodes, suppressor or auxiliary grids 4, 5, control grids 6, 7, and screen grids 8, 9. An electron emitting cathode 10 is interposed between control grid 7 and heater 11. The heater 11 is energized by any suitable voltage source, such as a battery 12. The anodes 2, 3 are connected to the opposite ends of an inductance coil L1 having a midpoint tap 13. A split stator type of condenser C1 is connected in parallel with inductance coil L1, both of these components forming a tuned tank circuit A. The output circuit of the oscillation frequency multiplier is inductively coupled to tank circuit A by an inductance coil L2. The center tap of inductance coil L1 is by-passed to ground 16 by a condenser 14. Condenser C1 has an electrical center connection 15 which connects to one end of an inductance coil L3. The other end of inductance coil L3 is connected to ground at 16.

An inductance coil L4 has its outer ends connected to a variable tuning condenser C2 which with inductance L4 forms a second tuned tank circuit B. The outer ends of inductance coil L4 are also connected to grids 4 and 5 of the vacuum tube V1. A crystal X (having electrodes 18 and 19) determines the fundamental frequency of the oscillator. Crystal electrode 18 is connected to grid 6, and crystal electrode 19 is connected to grid 7. At junction point 20 (grid 6) a connection is made to one end of resistor R2. The other end of resistor R2 is connected to the positive side of a direct current voltage source at junction point 21. A resistance R1 is connected at one end to junction point 22 or grid 7. The lower end of resistance R1 is connected to cathode 10 and ground 23. A by-pass condenser 24 is connected between the lower ends of resistors R1 and R2. Resistance R4 is connected to junction point 25 on the positive side of the direct current voltage source. At the other end, resistance R4 is connected to the mid point tap of inductance L4. A by-pass condenser 27 connects from the mid point tap of inductance L4 to ground 28. The grids 8 and 9 are connected together by lead 29 and are by-passed to ground 30 through condenser 31. Resistance R3 is connected to a junction point 32 on connection 29; the other end of this resistance is connected by junction point 33 and to the positive side of the direct current potential source.

The operation of the circuit shown in Fig. 1 is as follows: The cathode 10, grids 6, 7, 8 and 9, crystal X, and resistors R1 and R2 comprise a crystal oscillator circuit, which circuit operates in the well known Pierce mode. In this connection grid 6 acts as the plate or anode of the crystal controlled oscillator. Other types of oscillators which operate by other modes could be employed in this invention with equally good results.

As will be noted, since the auxiliary anodes 2 and 3 of tube V1 are connected in push-pull relation to the tank circuit A, ordinarily no crystal frequency power can be obtained in the output circuit coupled to the inductance L1, because of the balanced type of tank circuit A. The crystal frequency current flows to ground 16 at the electrical center 13 of the tank circuit A through by-pass condenser 14. It may now be noted that the coil L3 is connected between the center point of tank condenser C1 and ground; through coil L3 flows the crystal frequency current. Coupled to the coil L3 is the tuned tank circuit B which includes inductance coil L4 and condenser C2, and, as mentioned above, the center point of coil L4 is by-passed to ground and also connected to the positive side of the potential through resistor R4. The opposite ends of inductance coil L4 are connected to the grids 4 and 5 of tube V1. It will be seeen that the tank circuit B converts the push-push crystal frequency current in inductance coil L3 to push-pull alternating current potentials on the grids 4 and 5 of tube V1 because of the coupling arrangement shown. The anodes 2 and 3 then, in response to the grid voltage, drive the push-pull tank circuit A. These tank circuits may operate in any one of several ways, as follows:

First, assume tank circuit B to be tuned to the crystal frequency $f_c$, and the tank circuit A also to be tuned to frequency $f_c$. In this case we would obtain straight amplification of $f_c$, and the output frequency in the inductance coil L2 would then be the fundamental crystal frequency.

Second, assume tank circuit B to be tuned to the crystal frequency $f_c$, and the tank circuit A to be tuned to $2f_c$. In this case tank circuit A would be tuned to the upper side-band (considering the circuit as a balanced modulator), which is $f_c+f_c$, or $2f_c$. The lower sideband is then $f_c-f_c$, which is zero, and consequently the frequency of the output in inductance coil L2 would be twice the fundamental crystal frequency.

Third, if both of the tank circuits A and B are tuned to a frequency of $2f_c$, the output will be $2f_c$, since the tank circuit A would simply amplify the energy which comes out of the tank circuit B.

Fourth, assume tank circuit B to be tuned to the frequency $2f_c$, and the tank circuit A tuned to the frequency $3f_c$. In this case, by similar reasoning, the tank circuit A would again be tuned to the upper sideband which would be $f_c+2f_c$, or $3f_c$, and the output frequency would be three times that of the crystal or fundamental frequency. The lower sideband frequency $f_c$ would then be rejected by the tuning of the tank circuit A. It will be seen by similar reasoning that other higher harmonics of the crystal frequency can be obtained in the output circuit L2.

Referring now to the modification shown in Fig. 2, the single vacuum tube shown in Fig. 1 is replaced by separate vacuum tubes V1 and V2 of the 6A8 type. The tank circuits A and B are similar to that shown in Fig. 1, except that the opposite ends of inductance coil L1 are connected to anodes 2 and 3 of tubes V1 and V2. A variable condenser C3 is connected to the junction point 15 on capacitor C1. The other end of condenser C3 connects to one end of inductance L3. The other or left end of inductance coil L3 is connected to ground 16. The crystal X has electrodes 18 and 19. A connection is made from electrode 18 to grid 6 of tube V1 and gride 7 of tube V2. Electrode 19 is connected to grid 8 of tube V1 and grid 9 of tube V2. The efficiency of the circuit of the modification shown in Fig. 2 is improved over that of Fig. 1 by the addition of the variable condenser C3. In this case, condenser C3 is adjusted so that its reactance plus the reactance of condenser C1 tunes the inductive reactance of coil L3 to the crystal frequency. This increases the crystal frequency current in inductance coil L3 and thus increases the output power in inductance coil L2.

Figure 3:
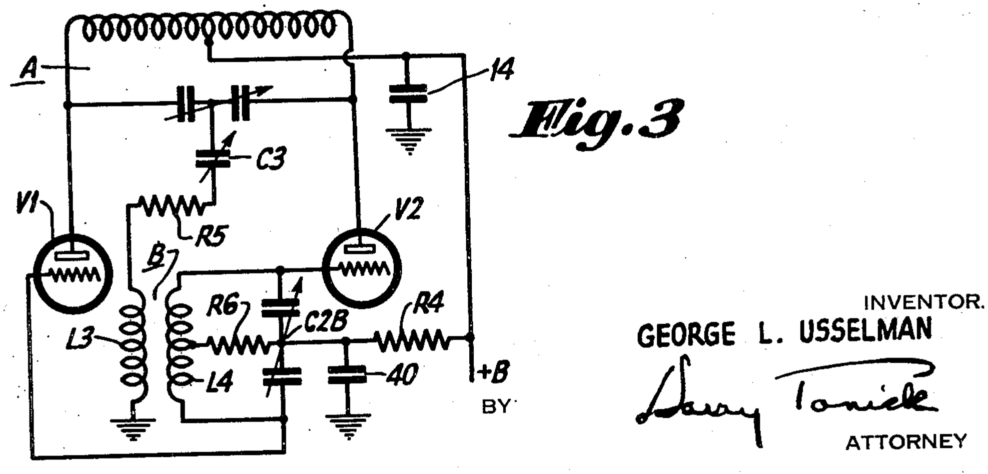
Fig. 3 is a modification of Fig. 2.

The circuit shown in Fig. 3 is a modification of that of Fig. 2 and is similar in all respects, except that a 200 ohm resistor R5 is interposed between the variable condenser C3 and the inductance coil L3 of tank circuit B. I have found that when this is done the tuning of the circuit C3, L3 and the tank circuit B (which includes condenser C2B and inductance coil L4) is less critical. The tuning condenser C2B, which is of the split stator balanced type, is substituted for the condenser C2 of Fig. 2. A by-pass condenser 40 is connected from the mid point of condenser C2B to ground, and the center point of coil L4 is connected to the mid point of C2B by resistor R6. With this modified circuit, more effective operation at higher harmonics than the second harmonic will be found possible.

In passing it is to be noted and clearly understood that the operation of the circuits of my invention may also be considered as a frequency multiplying action, without reference to balanced modulators. Operation in accordance with frequency multiplication principles should be self-evident from the description of the circuits herein given. Also, it is to be understood that crystal control, while desirable, may be dispensed with and other types of controlled oscillation generators substituted. Thus, in Fig. 1, grids 6, 7, and cathode 10 may be connected in Hartley or Colpitts fashion, resonant lines may be used for frequency control, etc.

What is claimed is:

1. Electric wave generating apparatus comprising an oscillation generator, said generator including an electron discharge device having a pair of auxiliary grids, a pair of auxiliary anodes, and a cathode, an oscillatory circuit connected in balanced relation to the auxiliary grids, an oscillatory circuit connected in balanced relation to the auxiliary anodes, and means coupling said oscillatory circuits in such a manner as to cause unbalance excitation of the circuit between said auxiliary grids.

2. An electric wave generating apparatus according to claim 1 characterized by the fact that the said circuits are tunable.

3. Electric wave generating apparatus comprising an oscillation generator, said generator including an electron discharge device having a pair of auxiliary grids, a pair of auxiliary anodes and a cathode, a first oscillatory circuit connected in balanced relation to the auxiliary grids, a second oscillatory circuit connected in balanced relation to the anodes and tuned to a harmonic of the frequency of said oscillation generator, and an element coupling the circuits together for causing unbalanced excitation of the circuit between said auxiliary grids.

4. An electric wave generating apparatus according to claim 3, characterized by the fact that the oscillation generator is crystal controlled.

5. An electric wave generating system, comprising an electron discharge device having within a single envelope, a cathode, a pair of anodes symmetrically positioned relative to said cathode, a pair of grids symmetrically positioned relative to said cathode, other grids in said envelope, means connecting together said other grids and the cathode to form an oscillation generator; a push-pull circuit connected to the anodes of said electron discharge device, and an output circuit coupled to said push-pull circuit.

6. An oscillation frequency multiplier system comprising an oscillation generator including an electron discharge device having a pair of anodes, a pair of auxiliary grids, a pair of control grids, and a cathode; a piezoelectric crystal forming part of said oscillation generator and connected to said control grids; an inductive circuit tuned to the fundamental frequency of said oscillation generator and connected to said auxiliary grids; a push-pull circuit tuned to a harmonic frequency of said generator, said push-pull circuit including an inductance having its opposite ends connected to corresponding anodes of said device; means coupling said inductive circuit to said push-pull circuit; and an output circuit inductively coupled to said push-pull circuit.

7. A crystal oscillation frequency system, comprising an oscillation generator including an electron discharge device having a pair of anodes, a pair of auxiliary grids, a pair of control grids and a cathode; a piezoelectric crystal forming part of said oscillation generator, said crystal being connected to the control grids of said electron discharge device; a push-pull tank circuit connected to the anodes of said electron discharge device; an inductance and a condenser forming a second tuned tank circuit and connected to the auxiliary grids of said electron discharge device, said second tank circuit having means for coupling to said push-pull tank circuit; and an output circuit coupled to said push-pull tank circuit.

8. In a signaling system, a crystal oscillation frequency multiplier comprising in combination, an electron discharge device having a pair of anodes, a pair of auxiliary grids, a pair of control grids and a cathode; a piezoelectric crystal forming part of said oscillation generator, said crystal being connected to the control grids of said electron discharge device; a first tank circuit connected to the anodes of said electron discharge device and tuned to a multiple of the foundamental frequency of said crystal; a second tank circuit connected to the auxiliary grids of said electron discharge device and coupled by an inductance to said first tank circuit and tuned to the fundamental frequency of said crystal; and an output circuit coupled to said first tank circuit.

9. In a signaling system, an amplifier circuit comprising in combination, an oscillation generator including an electron discharge device having a pair of anodes, a pair of auxiliary grids, a pair of control grids and a cathode; a piezoelectric crystal together with said electron discharge device forming said oscillation generator, said crystal being connected to the control grids of said electron discharge device; a first tank circuit connected to the anodes of said electron discharge device and tuned to the frequency of said crystal; a second tank circuit connected to the auxiliary grids of said electron discharge device and coupled by an inductance to said first tank circuit and also tuned to the frequency of said crystal; and an output circuit coupled by an inductance coil to said first tank circuit.

10. A crystal oscillation generator comprising an oscillation generator including an electron discharge device having a pair of anodes, a pair of auxiliary grids, a pair of control grids, and a cathode; a piezoelectric crystal forming part of said oscillation generator, said crystal being connected to the control grids of said electron discharge device; a first tank circuit connected to the anodes of said electron discharge device; a second tuned tank circuit connected to said auxiliary grids; an inductive coupling element having one end connected to the electrical center of said first circuit and its other end connected to ground, said second tank circuit being coupled by said inductive coupling element to said first tank circuit; and an output circuit coupled to said first tank circuit.

11. In a signaling system, a single electron discharge device having two anodes, two auxiliary grids, two screen grids, two control grids and a cathode, means connecting said cathode and said control grids together for generating high frequency oscillations, a first tuned high frequency circuit connected between said anodes, a second tuned high frequency circuit connected between said auxiliary grids, means coupling said first tuned circuit to said second tuned circuit, means connecting said screen grids to midpoint taps on said first and second tuned circuits, and an output circuit coupled to said first tuned circuit.

12. In a signaling system, a single electron discharge device having two anodes, two auxiliary grids, two screen grids, two control grids and a cathode, means connecting said cathode and said control grids together for generating high frequency oscillations, a first tuned high frequency circuit tuned to a harmonic of said high frequency oscillations and connected between said anodes, a second tuned high frequency circuit tuned to the fundamental frequency of said high frequency oscillations and connected between said auxiliary grids, means coupling said first tuned circuit to said second tuned circuit, means connecting said screen grids to midpoint taps on said first and second tuned circuits, and an output circuit coupled to said first tuned circuit, whereby said high frequency oscillations are multiplied in said output circuit.

13. An arrangement of electron discharge device electrodes including two anodes, two auxiliary grids, two control grids and at least one cathode, means connecting said cathode and said control grids together for generating high frequency oscillations, a first tuned high frequency circuit connected between said anodes, a second tuned high frequency circuit connected between said auxiliary grids, means coupling said first tuned circuit to said second tuned circuit, and an output circuit coupled to said first tuned circuit.

14. A crystal oscillation generator comprising a pair of electron discharge devices each having an anode, a plurality of grids, and a cathode; a piezoelectric crystal connected between two of the grids in each of said devices to form together with said devices said oscillation generator; a push-pull circuit connected to the anodes of the two devices; a tuned tank circuit connected to other grids in the two devices; an inductance inductively coupled to said tank circuit; a variable condenser connected between said inductance and said push-pull circuit to couple said tank circuit to said push-pull circuit; and an output circuit coupled to said push-pull circuit.

15. An oscillation frequency multiplier circuit comprising a pair of electron discharge devices each having an anode, a plurality of grids, and a cathode; a piezoelectric crystal connnected between two of the grids in each of said devices to form together with said devices an oscillation generator; a first tank circuit having an inductance and a condenser connected in parallel, said tank circuit being connected to the anodes of the two devices and said condenser being of the split stator type to provide an electrical center point on such tank circuit; a second tank circuit connected to other grids in the two devices; variable coupling means between the center point of said first tank circuit and said second tank circuit; and an output circuit inductively coupled to said inductance.

16. An oscillation frequency amplifier comprising a pair of electron discharge devices each having an anode, a plurality of grids, and a cathode; a piezoelectric crystal connected between two of the grids in each of said devices to form together with said devices an oscillation generator; a first tank circuit connected in push-pull relation to the anodes of the two devices, said circuit having an electrical center point; a second tank circuit connected to other grids in the two devices; means inductively and capacitively coupling said second circuit to the center point of said first circuit; and an output circuit coupled to said first circuit.

GEORGE L. USSELMAN.

REFERENCES CITED

The following references are of record in the file of this patent:

UNITED STATES PATENTS

| Number | Name | Date |
|---|---|---|
| 1,754,749 | Gerth | Apr. 15, 1930 |
| 1,914,120 | Hagen | June 13, 1933 |